US008258744B2

(12) United States Patent
Ishii et al.

(10) Patent No.: US 8,258,744 B2
(45) Date of Patent: Sep. 4, 2012

(54) CHARGING CONTROL APPARATUS FOR VEHICLE

(75) Inventors: Kenichi Ishii, Nishikamo-gun (JP); Ryuichi Kamaga, Nisshin (JP); Masahiro Karami, Obu (JP); Satoshi Fukui, Kobe (JP)

(73) Assignees: Toyota Jidosha Kabushiki Kaisha, Toyota (JP); Denso Corporation, Kariya (JP); Fujitsu Ten Limited, Kobe (JP)

( * ) Notice: Subject to any disclaimer, the term of this patent is extended or adjusted under 35 U.S.C. 154(b) by 114 days.

(21) Appl. No.: 12/742,864

(22) PCT Filed: Dec. 10, 2008

(86) PCT No.: PCT/JP2008/072377
§ 371 (c)(1),
(2), (4) Date: May 13, 2010

(87) PCT Pub. No.: WO2009/090810
PCT Pub. Date: Jul. 23, 2009

(65) Prior Publication Data
US 2010/0295507 A1    Nov. 25, 2010

(30) Foreign Application Priority Data

Jan. 16, 2008 (JP) ................................. 2008-007118

(51) Int. Cl.
*H01M 10/46* (2006.01)
(52) U.S. Cl. ...................................................... 320/104
(58) Field of Classification Search .................. 320/104, 320/107, 109, 111, 134, 136; 903/902, 903, 903/907; 180/65.1, 65.21, 65.245
See application file for complete search history.

(56) References Cited

U.S. PATENT DOCUMENTS

| 5,369,352 | A | * | 11/1994 | Toepfer et al. | 320/110 |
| 5,629,606 | A | * | 5/1997 | Asada | 322/28 |
| 5,642,270 | A | | 6/1997 | Green et al. | |
| 5,952,813 | A | | 9/1999 | Ochiai | |
| 7,405,541 | B2 | | 7/2008 | Inokuchi et al. | |
| 7,688,024 | B2 | * | 3/2010 | Kamaga | 320/104 |
| 2007/0114976 | A1 | | 5/2007 | Inokuchi et al. | |
| 2011/0291612 | A1 | * | 12/2011 | Fujitake | 320/107 |

FOREIGN PATENT DOCUMENTS

DE   35 28 659 A1   2/1987
(Continued)

OTHER PUBLICATIONS

Mar. 6, 2012 Extended Search Report issued in European Patent Application No. 08870819.3.

(Continued)

*Primary Examiner* — Edward Tso
(74) *Attorney, Agent, or Firm* — Oliff & Berridge, PLC

(57) ABSTRACT

An oscillator provided in a charging cable outputs a non-oscillating signal when the potential of a pilot signal is around V(1), and outputs an oscillating signal when the potential of the pilot signal is lowered to V(2). A pull-down resistance element provided in the plug-in hybrid vehicle is connected between a control pilot line and a vehicle earth, and changes the potential of the pilot signal from V(1) to V(2). A switch is connected in series between the pull-down resistance element and the vehicle earth. When the charging cable is connected to the vehicle, the switch is turned off and the pull-down resistance element is separated from the vehicle earth.

6 Claims, 17 Drawing Sheets

FOREIGN PATENT DOCUMENTS

| | | |
|---|---|---|
| GB | 2 182 792 A | 5/1987 |
| JP | A-6-343204 | 12/1994 |
| JP | A-7-123519 | 5/1995 |
| JP | A-07-240705 | 9/1995 |
| JP | A-7-255105 | 10/1995 |
| JP | A-07-303334 | 11/1995 |
| JP | A-09-508256 | 8/1997 |
| JP | A-10-108379 | 4/1998 |
| JP | A-10-290533 | 10/1998 |
| JP | A-2000-270484 | 9/2000 |
| JP | A-2007-143319 | 6/2007 |
| RU | 2 048 309 C1 | 11/1995 |
| RU | 2 282 301 C2 | 8/2006 |

OTHER PUBLICATIONS

"Surface Vehicle Recommended Practice;" SAE; 2001; pp. 1-32; Society of Automotive Engineers.

International Search Report mailed on Mar. 10, 2009 in corresponding International Application No. PCT/JP2008/072377 (with translation).

Jul. 27, 2011 Office Action in Russian Patent Application No. 2010133946/11(048207) (with translation).

Apr. 19, 2012 Office Action issued in Japanese Application No. 10-2010-7015831 (with translation).

Apr. 19, 2012 Office Action issued in Korean Application No. 10-2010-7015831 (with translation).

* cited by examiner

FIG. 13

| STATE OF PISW SIGNAL | NORMAL STATE | | | ABNORMAL STATE |
|---|---|---|---|---|
| STATE OF CHARGING CABLE | CONNECTED STATE | STANDBY STATE | NON-CONNECTED STATE | CONNECTED STATE |
| POTENTIAL OF CPLT | V(1) | V(0) | V(0) | V(1) |
| SIGNAL LEVEL OF PISW | LOW | LOW | HI | HI |

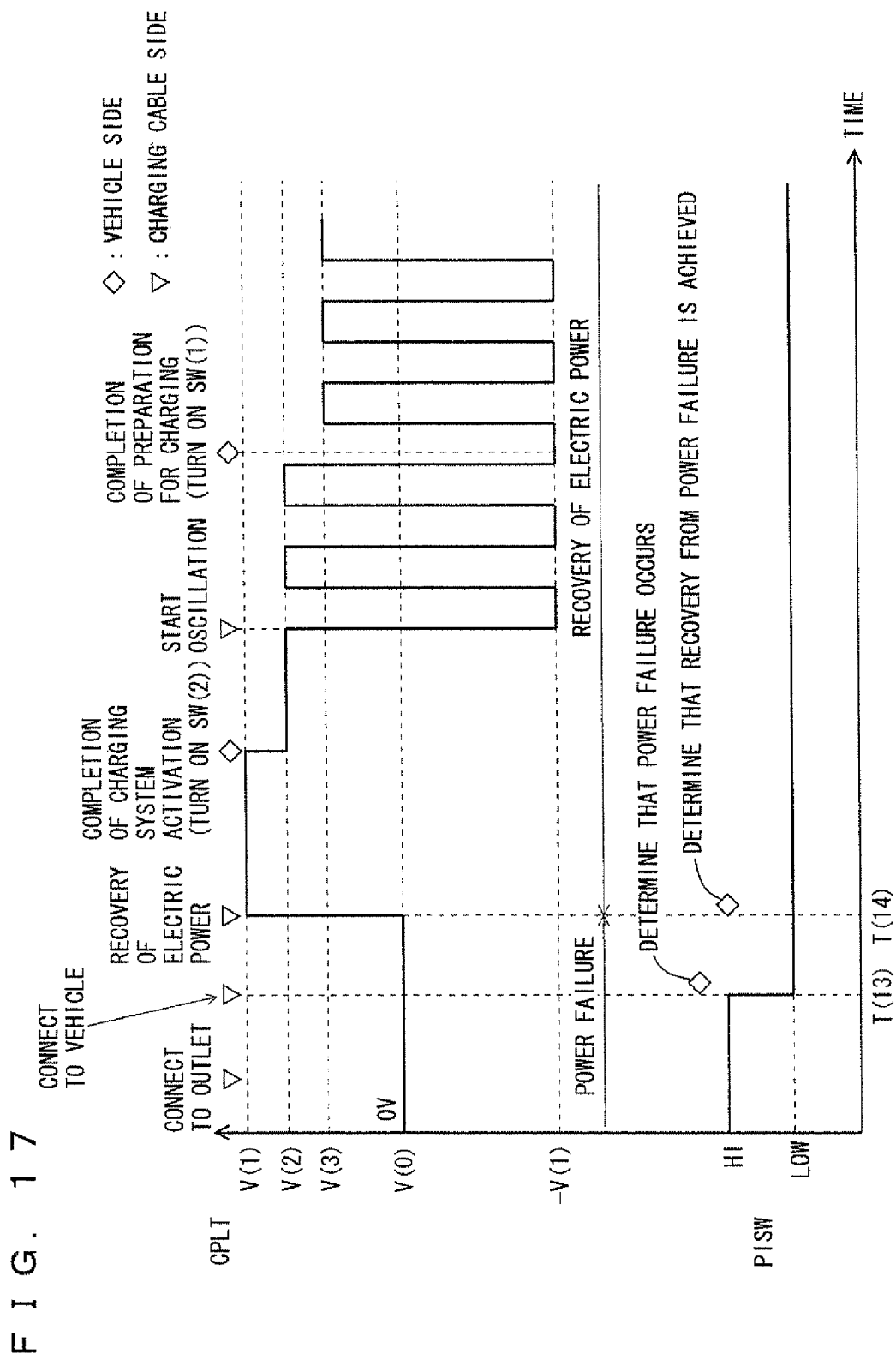

CHARGING CONTROL APPARATUS FOR VEHICLE

TECHNICAL FIELD

The present invention relates to charging control for a vehicle, and in particular, to charging control for a vehicle including a charging system that charges a power storage device for driving the vehicle with electric power supplied from a power supply external to the vehicle.

BACKGROUND ART

In recent years, an electric vehicle, a hybrid vehicle, a fuel cell vehicle and the like have received attention as an environmentally-friendly vehicle. On these vehicles, a motor that generates driving force for traveling as well as a power storage device that stores electric power supplied to the motor are mounted. The hybrid vehicle further has an internal combustion engine mounted thereon as a power source, together with the motor. The fuel cell vehicle has a fuel cell mounted thereon as a direct current (DC) power supply for driving the vehicle. Among these vehicles, a vehicle is known in which a vehicle-mounted power storage device for driving the vehicle can be charged from a power supply in ordinary households. For example, a power supply outlet provided at home is connected to a charging port provided at the vehicle by using a charging cable, so that electric power is supplied from the power supply in the ordinary households to the power storage device. It is noted that the vehicle in which the vehicle-mounted power storage device can be charged from the power supply external to the vehicle as described above will also be referred to as "plug-in vehicle" hereinafter. For example, Japanese Patent Laying-Open No. 2000-270484 (Patent Document 1) discloses a technique of detecting an abnormality such as a break or a power failure of a commercial power supply after charging starts in the foregoing plug-in vehicle.

An abnormality detecting apparatus disclosed in Japanese Patent Laying-Open No. 2000-270484 includes: a motor; a battery; a converting unit connected between the motor and the battery, for converting an alternating current from the commercial power supply to a direct current via the motor in accordance with a switching signal and supplying the direct current to the battery; a voltage phase detecting unit connected between the motor and the commercial power supply, for determining zero cross on/off of a commercial power supply voltage and detecting a voltage phase of the commercial power supply voltage; a first current detecting unit for detecting the alternating current flowing through a coil of the motor; a second current detecting unit for detecting the direct current supplied from the converting unit to the battery; a command value generating unit for generating an alternating current command value based on a command value for charging, the result of the detection by the second current detecting unit, and the voltage phase; a switching signal generating unit for generating a switching signal based on the alternating current command value and the result of the detection by the first current detecting unit; and an abnormality detecting unit for detecting an abnormality based on the alternating current command value and the result of the detection by the first current detecting unit.

According to the abnormality detecting apparatus disclosed in Japanese Patent Laying-Open No. 2000-270484, the alternating current from the commercial power supply is converted to the direct current via the motor in accordance with the switching signal, and the direct current is supplied to the battery. Then, the zero cross on/off of the commercial power supply voltage of the commercial power supply is determined, the voltage phase of the commercial power supply voltage is detected, and the alternating current flowing through the coil of the motor as well as the direct current supplied to the battery are detected. In addition, the alternating current command value is generated based on the command value for charging, the result of the detection of the direct current, and the voltage phase. The switching signal is generated based on the alternating current command value and the result of the detection of the alternating current. Moreover, the abnormality is detected based on the alternating current command value and the result of the detection of the alternating current. Accordingly, the abnormality that occurs at a charging control apparatus after charging starts can be detected. In addition, since it is not required to place a new special sensor for detecting the abnormality, the cost of the abnormality detecting apparatus can be reduced.

Patent Document 1: Japanese Patent Laying-Open No. 2000-270484

DISCLOSURE OF THE INVENTION

Problems to be Solved by the Invention

An oscillator for generating a pilot signal having a pulse width based on the magnitude of a rated current and the like that can be supplied from a power supply to a vehicle is provided within a charging cable in some cases. This pilot signal is used to determine whether or not charging is possible on the vehicle side, and it is desired to use this pilot signal not only for the determination as to whether or not charging is possible but also for activation of a charging system on the vehicle side, detection of a break within the charging system, and the like. Although Japanese Patent Laying-Open No. 2000-270484 discloses a technique of detecting the abnormality in the charging control apparatus based on the command value and the result of the detection of the alternating current from the commercial power supply, it does not disclose a technique of detecting the abnormality and controlling charging by using the pilot signal generated at the oscillator within the charging cable.

The present invention has been made to solve the above-described problems, and an object thereof is to provide a charging control apparatus that can use a pilot signal from an oscillator within a charging cable as an activation signal for a charging system of a vehicle.

Means for Solving the Problems

A charging control apparatus according to the present invention controls a vehicle including a charging system for charging a power storage device with electric power supplied from a power supply external to the vehicle through a charging cable. The vehicle receives a pilot signal from an oscillator provided in the charging cable when the charging cable connects the power supply and the vehicle. The oscillator causes the pilot signal to oscillate in a pulse width based on magnitude of a rated current that can be supplied to the vehicle, in response to a change in a potential of the pilot signal from an initial potential to an oscillation potential. The charging control apparatus includes: a control pilot line to which the pilot signal is input; a resistance element connected between the control pilot line and a vehicle earth, for changing the potential of the pilot signal from the initial potential to the oscillation potential; a switching unit connected either between the control pilot line and the resistance element or between the resistance element and the vehicle earth, and switched to any one of a separated state where the resistance element is separated from any one of the control pilot line and the vehicle earth, and a connected state where the resistance element is connected to the control pilot line and the vehicle earth; and a control unit for starting activation of the charging system based on the potential of the control pilot line. The control unit controls the switching unit to the separated state at least upon connecting the charging cable and the vehicle.

According to the present invention, the resistance element for changing the potential of the pilot signal from the initial potential to the oscillation potential is connected between the vehicle earth and the control pilot line to which the pilot signal (pilot signal CPLT) from the oscillator provided in the charging cable is input. The switching unit is controlled by the control unit, and thereby, this resistance element is separated from any one of the control pilot line and the vehicle earth at least upon connecting the charging cable and the vehicle. As a result, since the potential of the pilot signal does not change to the oscillation potential at least upon connecting the charging cable and the vehicle, the pilot signal does not oscillate and the potential thereof is retained at the initial potential. Therefore, it can be readily determined that the potential of the control pilot line has changed to the initial potential, without using a complicated F/V (Frequency to Voltage) converter, and the activation of the charging system can start based on the result of the determination. In other words, the pilot signal from the oscillator can be used as an activation signal for the charging system of the vehicle. Consequently, there can be provided a charging control apparatus that can use the pilot signal from the oscillator within the charging cable as the activation signal for the charging system of the vehicle.

Preferably, the control unit controls the switching unit to the separated state upon connecting the charging cable and the vehicle, and controls the switching unit to the connected state upon completion of the activation of the charging system.

According to the present invention, the resistance element is separated from any one of the control pilot line and the vehicle earth upon connecting the charging cable and the vehicle. Therefore, the pilot signal from the oscillator can be used as the activation signal for the charging system. Furthermore, the resistance element is connected to the control pilot line and the vehicle earth upon completion of the activation of the charging system. As a result, the potential of the pilot signal changes to the oscillation potential, and therefore, the pilot signal oscillates in the pulse width based on the magnitude of the rated current that can be supplied to the vehicle. Therefore, the rated current that can be supplied to the vehicle can be detected by detecting the pulse width of the pilot signal.

More preferably, the control unit further determines whether or not the charging cable is connected to the vehicle, based on presence or absence of the pilot signal.

According to the present invention, it is determined whether or not the charging cable is connected to the vehicle, based on the presence or absence of the pilot signal. Therefore, even when there is no signal of connection between the charging cable and the vehicle or even when the signal of connection between the charging cable and the vehicle is abnormal, for example, it can be appropriately determined whether or not the charging cable is connected to the vehicle.

More preferably, the vehicle receives a connection signal whose output changes in accordance with a state of connection between the charging cable and the vehicle. The control unit further detects an abnormality in the connection signal based on a result of comparison between the connection signal and the pilot signal.

According to the present invention, when an output of the connection signal indicates that the charging cable is not connected to the vehicle although the charging cable is connected to the vehicle and the pilot signal from the oscillator is retained at the initial potential, for example, the abnormality in the connection signal can be detected. Therefore, the pilot signal from the oscillator can be readily used for the detection of the abnormality in the connection signal.

More preferably, the vehicle receives a connection signal whose output changes in accordance with a state of connection between the charging cable and the vehicle. The control unit further detects at least any one of stop of electric power feed to the power supply and restart of electric power feed to the power supply, based on the potential of the control pilot line, when it is determined that the charging cable is connected to the vehicle, based on the connection signal.

According to the present invention, when the output of the connection signal indicates that the charging cable is connected to the vehicle and when the potential of the control pilot line is the potential when the pilot signal from the oscillator is not input, for example, it can be determined that the electric power feed to the power supply stops. Furthermore, when the potential of the control pilot line has changed from the potential when the pilot signal from the oscillator is not input to the initial potential, it can be determined that recovery from a power failure has been achieved.

More preferably, the pilot signal is input to the control pilot line when a reserved charging time set in a timer for reserving vehicle charging comes, while the charging cable is connected to the vehicle and connected to the power supply with the timer interposed.

According to the present invention, the pilot signal is input to the control pilot line when the reserved charging time set in the timer comes. Therefore, when the reserved charging time comes, the potential of the control pilot line changes from the potential when the pilot signal is not input to the initial potential, and is retained at the initial potential. Therefore, it can be readily determined that the potential of the control pilot line has changed to the initial potential, and the activation of the charging system can start based on the result of the determination. According to such a configuration, simply connecting the commercially available and inexpensive charging timer between the charging cable and the power supply, without providing the timer function on the vehicle side, allows charging at a charging start time (for example, the nighttime when the electric power fee is inexpensive) preselected by the user.

BRIEF DESCRIPTION OF THE DRAWINGS

FIG. 13 is a comparison table of pilot signal CPLT and cable connection signal PISW.

FIG. 17 is a timing chart (No. 3) of pilot signal CPLT and cable connection signal PISW.

Figure 1:
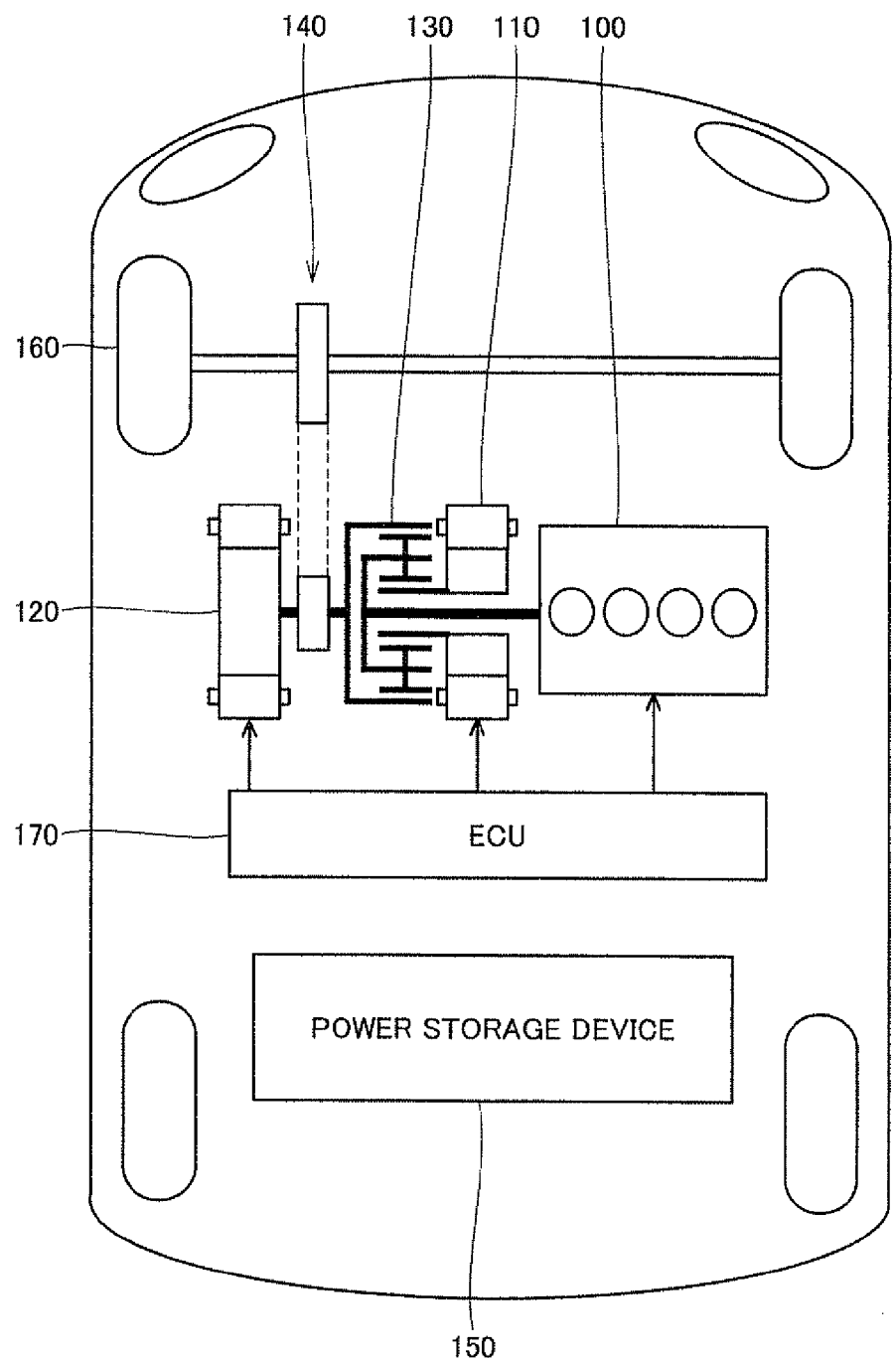
FIG. 1 is an overall block diagram of a plug-in hybrid vehicle shown as an example of a vehicle on which a charging control apparatus according to a first embodiment of the present invention is mounted.

DESCRIPTION OF THE REFERENCE SIGNS 100 engine; 110 first MG; 112, 122 neutral point; 120 second MG; 130 power split device; 140 reduction gear; 150 power storage device; 160 driving wheel; 170 ECU; 171 voltage sensor; 172 current sensor; 200 converter; 210 first inverter; 220 second inverter; 250 SMR; 260 DFR; 270 charging inlet; 280 LC filter; 300 charging cable; 310 connector; 312 limit switch; 320 plug; 330 CCID; 332 relay; 334 EVSE controller; 400 power supply outlet; 402 power supply; 406 charging timer; 502 resistance circuit; 508, 510 input buffer; 512, 514, 520 CPU; 516 power supply; 518 vehicle earth; 522 VL(1) detecting unit; 524 charging control unit; 602 oscillator; 604 voltage sensor; 606 electromagnetic coil; 608 leakage detector; R(1) resistance element; R(2), R(3) pull-down resistance element; SW(1), SW(2) switch; L(1) control pilot line; L(2) signal line

BEST MODES FOR CARRYING OUT THE INVENTION

Embodiments of the present invention will be described hereinafter with reference to the drawings. In the following description, the same components are denoted with the same reference characters. Their names and functions are also the same. Accordingly, detailed description on them will not be repeated.

First Embodiment

A plug-in hybrid vehicle including a charging control apparatus according to the present embodiment will be described with reference to FIGS. 1 and 2. It is noted that the vehicle to which the charging control apparatus according to the present embodiment is applied is not limited to a hybrid vehicle, but may be an electric vehicle.

This plug-in hybrid vehicle includes an engine 100, a first MG (Motor Generator) 110, a second MG 120, a power split device 130, a reduction gear 140, a power storage device 150, a driving wheel 160, and an ECU 170.

Engine 100, first MG 110 and second MG 120 are coupled to power split device 130. The plug-in hybrid vehicle travels by using driving force from at least one of engine 100 and second MG 120. Motive power generated by engine 100 is split by power split device 130 into two paths, that is, one path through which the motive power is transmitted to driving wheel 160 via reduction gear 140, and the other through which the motive power is transmitted to first MG 110.

First MG 110 is an alternating current (AC) rotating electric machine, and is a three-phase AC synchronous motor including a U-phase coil, a V-phase coil and a W-phase coil, for example. First MG 110 generates electric power by using the motive power of engine 100 split by power split device 130. For example, when a state of charge (that will also be referred to as "SOC (State of Charge)" hereinafter) of power storage device 150 falls below a predetermined value, engine 100 starts and electric power is generated by first MG 110. The electric power generated by first MG 110 is converted from AC to DC by an inverter (that will be described hereinafter), voltage thereof is adjusted by a converter (that will be described hereinafter), and then the electric power is stored in power storage device 150.

Second MG 120 is an AC rotating electric machine, and is a three-phase AC synchronous motor including a U-phase coil, a V-phase coil and a W-phase coil, for example. Second MG 120 generates driving force by using at least one of the electric power stored in power storage device 150 and the electric power generated by first MG 110. The driving force of second MG 120 is transmitted to driving wheel 160 via reduction gear 140. As a result, second MG 120 assists engine 100 or causes the vehicle to travel by using the driving force from second MG 120. Although driving wheel 160 is shown as a front wheel in FIG. 1, a rear wheel may be driven by second MG 120, instead of the front wheel or together with the front wheel.

It is noted that, at the time of braking and the like of the vehicle, second MG 120 is driven by driving wheel 160 via reduction gear 140, and second MG 120 is operated as a generator. As a result, second MG 120 is operated as a regenerative brake for converting braking energy to electric power. The electric power generated by second MG 120 is stored in power storage device 150.

Power split device 130 is formed of a planetary gear including a sun gear, a pinion gear, a carrier, and a ring gear. The pinion gear engages the sun gear and the ring gear. The carrier rotatably supports the pinion gear, and in addition, is coupled to a crankshaft of engine 100. The sun gear is coupled to a rotation shaft of first MG 110. The ring gear is coupled to a rotation shaft of second MG 120 and reduction gear 140.

Figure 2:
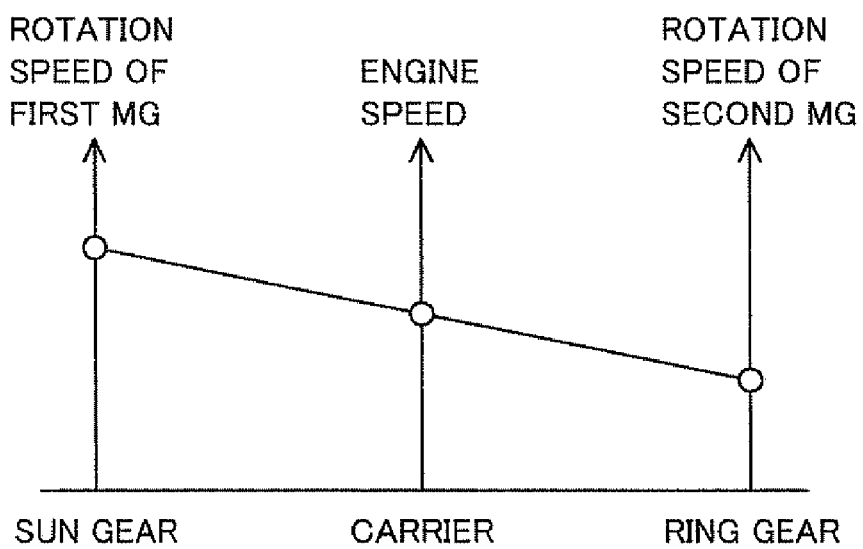
FIG. 2 illustrates a collinear chart of a power split device according to the first embodiment of the present invention.

Engine 100, first MG 110 and second MG 120 are coupled with power split device 130 formed of the planetary gear being interposed therebetween, so that the relationship between rotation speeds of engine 100, first MG 110 and second MG 120 is such that they are connected by a straight line in a collinear chart as shown in FIG. 2.

Power storage device 150 is a rechargeable DC power supply, and is formed of a secondary battery such as nickel-metal hydride and lithium ion, for example. The voltage of power storage device 150 is, for example, about 200V. In addition to the electric power generated by first MG 110 and second MG 120, electric power supplied from a power supply external to the vehicle is stored in power storage device 150, as will be described hereinafter. It is noted that a large-capacitance capacitor can also be employed as power storage device 150, and any electric power buffer may be employed if it can temporarily store the electric power generated by first MG 110 and second MG 120 as well as the electric power from the power supply external to the vehicle and supply the stored electric power to second MG 120.

Engine 100, first MG 110 and second MG 120 are controlled by ECU 170. It is noted that ECU 170 may be divided into a plurality of ECUs for each function. It is noted that a configuration of ECU 170 will be described hereinafter.

Figure 3:
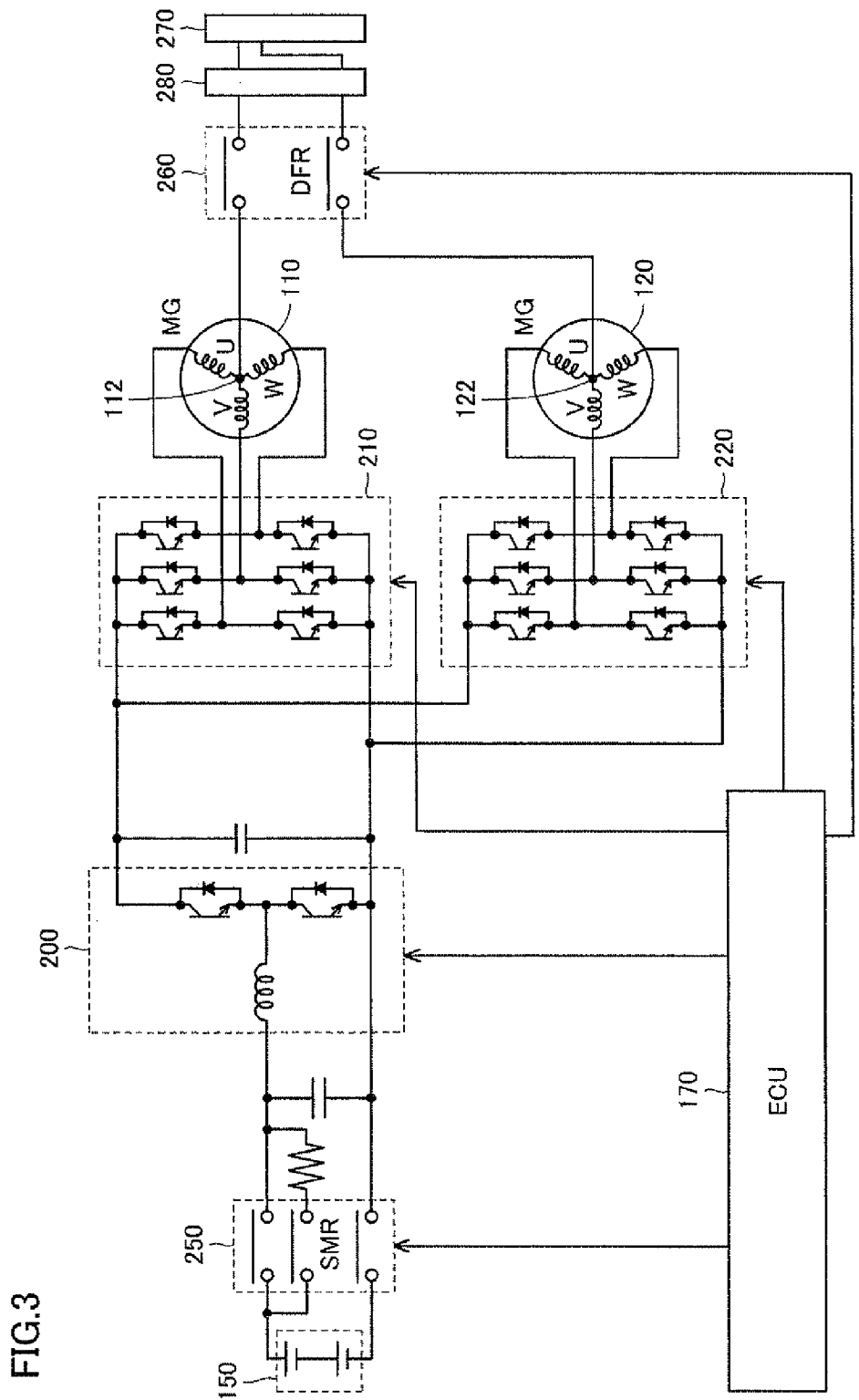
FIG. 3 is an overall configuration diagram of an electrical system in the plug-in hybrid vehicle according to the first embodiment of the present invention.

An electrical system of the plug-in hybrid vehicle according to the present embodiment will be described with reference to FIG. 3. This electrical system includes power storage device 150, an SMR (System Main Relay) 250, a converter 200, a first inverter 210, a second inverter 220, first MG 110, second MG 120, a DFR (Dead Front Relay) 260, an LC filter 280, a charging inlet 270, and ECU 170.

SMR 250 is provided between power storage device 150 and converter 200. SMR 250 is a relay for electrically connecting/disconnecting power storage device 150 and the electrical system, and on/off of SMR 250 is controlled by ECU 170. In other words, when the vehicle travels and when power storage device 150 is charged from the power supply external to the vehicle, SMR 250 is turned on, and power storage device 150 is electrically connected to the electrical system. On the other hand, when the vehicle system stops, SMR 250 is turned off, and power storage device 150 is electrically disconnected from the electrical system.

Converter 200 includes a reactor, two npn-type transistors and two diodes. The reactor has one end connected to the positive electrode side of power storage device 150, and the other end connected to a connection node of the two npn-type transistors. The two npn-type transistors are connected in series, and each npn-type transistor has the diode connected in antiparallel.

It is noted that an IGBT (Insulated Gate Bipolar Transistor), for example, can be used as the npn-type transistor. Furthermore, a power switching element such as a power MOSFET (Metal Oxide Semiconductor Field-Effect Transistor) may be used instead of the npn-type transistor.

When electric power is supplied from power storage device 150 to first MG 110 or second MG 120, converter 200 boosts the electric power discharged from power storage device 150 and supplies the electric power to first MG 110 or second MG 120, based on a control signal from ECU 170. Furthermore, when power storage device 150 is charged, converter 200 steps down the electric power supplied from first MG 110 or second MG 120 and outputs the electric power to power storage device 150.

First inverter 210 includes a U-phase arm, a V-phase arm and a W-phase arm. The U-phase arm, the V-phase arm and the W-phase arm are connected in parallel. Each phase arm includes two npn-type transistors connected in series, and each npn-type transistor has a diode connected in antiparallel. A connection point between the two npn-type transistors in each phase arm is connected to an end of a corresponding coil in first MG 110 that is different from a neutral point 112.

First inverter 210 converts DC electric power supplied from converter 200 to AC electric power, and supplies the converted AC electric power to first MG 110. Furthermore, first inverter 210 converts AC electric power generated by first MG 110 to DC electric power, and supplies the converted DC electric power to converter 200.

Second inverter 220 also has a configuration similar to that of first inverter 210. A connection point between two npn-type transistors in each phase arm is connected to an end of a corresponding coil in second MG 120 that is different from a neutral point 122.

Second inverter 220 converts DC electric power supplied from converter 200 to AC electric power, and supplies the converted AC electric power to second MG 120. Furthermore, second inverter 220 converts AC electric power generated by second MG 120 to DC electric power, and supplies the converted DC electric power to converter 200.

In addition, when power storage device 150 is charged from the power supply external to the vehicle, first inverter 210 and second inverter 220 convert AC electric power provided from the power supply external to the vehicle to neutral point 112 of first MG 110 and neutral point 122 of second MG 120, to DC electric power, based on a control signal from ECU 170, and supply the converted DC electric power to converter 200 by using a method that will be described hereinafter.

DFR 260 is provided between a pair of power lines connected to neutral points 112, 122 and a pair of power lines connected to LC filter 280. DFR 260 is a relay for electrically connecting/disconnecting charging inlet 270 and the electrical system, and on/off of DFR 260 is controlled by ECU 170. In other words, when the vehicle travels, DFR 260 is turned off, and charging inlet 270 is electrically separated from the electrical system. On the other hand, when power storage device 150 is charged from the power supply external to the vehicle, DFR 260 is turned on, and charging inlet 270 is electrically connected to the electrical system.

LC filter 280 is provided between DFR 260 and charging inlet 270, and prevents output of a high-frequency noise from the electrical system of the plug-in hybrid vehicle to the power supply external to the vehicle when power storage device 150 is charged from the power supply external to the vehicle.

Charging inlet 270 serves as an electric power interface for receiving charging electric power from the power supply external to the vehicle. When power storage device 150 is charged from the power supply external to the vehicle, a connector of a charging cable through which electric power is supplied to the vehicle from the power supply external to the vehicle is connected to charging inlet 270.

ECU 170 generates the control signals for driving SMR 250, DFR 260, converter 200, first inverter 210, and second inverter 220, and controls the operation of each of these devices.

Figure 4:
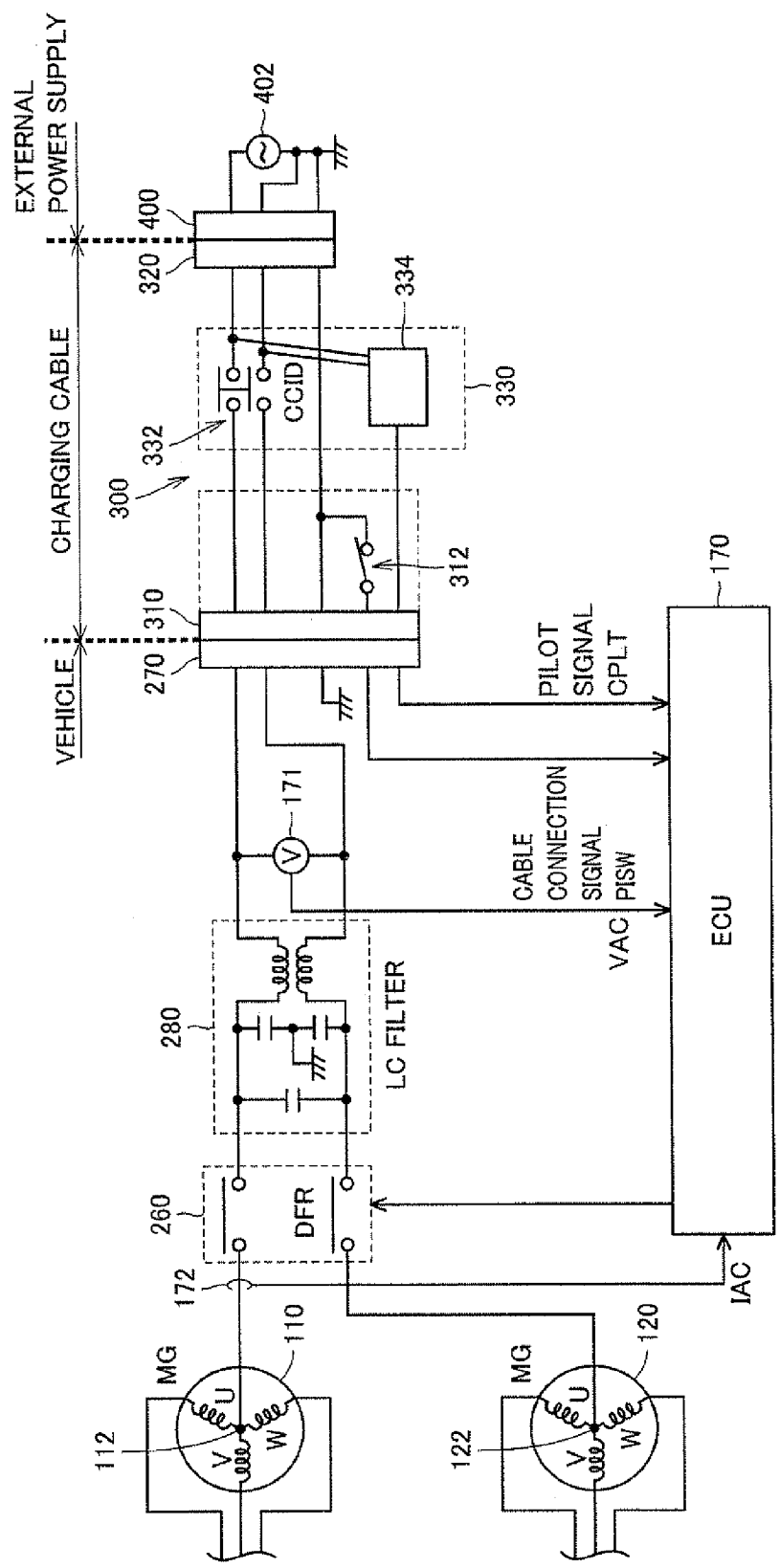
FIG. 4 is a schematic configuration diagram of a portion related to a charging system of the electrical system according to the first embodiment of the present invention.

A portion related to a charging system in the electrical system according to the present embodiment will be described with reference to FIG. 4. A charging cable 300 for coupling the plug-in hybrid vehicle and the power supply external to the vehicle includes a connector 310, a plug 320 and a CCID (Charging Circuit Interrupt Device) 330.

Connector 310 is configured to be capable of being connected to charging inlet 270 provided at the vehicle. A limit switch 312 is provided at connector 310. When connector 310 is connected to charging inlet 270, limit switch 312 is activated, and a cable connection signal PISW indicating that connector 310 is connected to charging inlet 270 is input to ECU 170.

Plug 320 is connected to a power supply outlet 400 provided at home, for example. AC electric power is supplied from a power supply 402 (for example, a system power supply) to power supply outlet 400.

CCID 330 includes a relay 332 and an EVSE (Electric Vehicle Supply Equipment) controller 334. Relay 332 is provided in a pair of power lines through which the charging electric power is supplied from power supply 402 to the plug-in hybrid vehicle. On/off of relay 332 is controlled by EVSE controller 334. When relay 332 is turned off, a conducting path through which electric power is supplied from power supply 402 to the plug-in hybrid vehicle is disconnected. On the other hand, when relay 332 is turned on, electric power can be supplied from power supply 402 to the plug-in hybrid vehicle.

When plug 320 is connected to power supply outlet 400, EVSE controller 334 is operated by the electric power supplied from power supply 402, EVSE controller 334 generates a pilot signal CPLT to be sent to ECU 170 of the vehicle through a control pilot line. When connector 310 is connected to charging inlet 270 and the potential of pilot signal CPLT is lowered to a prescribed value, EVSE controller 334 causes pilot signal CPLT to oscillate in a prescribed duty cycle (a ratio of a pulse width to an oscillation cycle).

This duty cycle is set based on a rated current that can be supplied from power supply 402 through charging cable 300 to the vehicle.

A voltage sensor 171 and a current sensor 172 are provided on the vehicle side. Voltage sensor 171 detects a voltage VAC between a pair of power lines provided between charging inlet 270 and LC filter 280, and outputs the detected value to ECU 170. Current sensor 172 detects a current IAC flowing through a power line between DFR 260 and neutral point 112 of first MG 110, and outputs the detected value to ECU 170. It is noted that current sensor 172 may be provided at a power line between DFR 260 and neutral point 122 of second MG 120.

Figure 5:
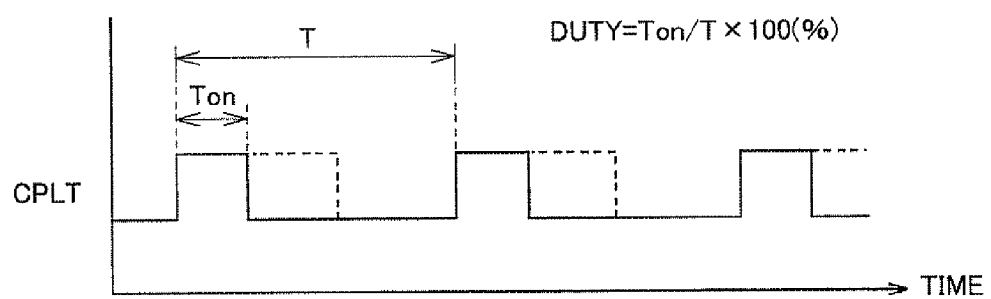
FIG. 5 illustrates a waveform of a pilot signal generated by an EVSE controller according to the first embodiment of the present invention.

Pilot signal CPLT generated by EVSE controller 334 will be described with reference to FIG. 5. Pilot signal CPLT oscillates in a prescribed cycle T. Here, a pulse width Ton of pilot signal CPLT is set based on the rated current that can be supplied from power supply 402 through charging cable 300 to the vehicle. The notification of the rated current is provided from EVSE controller 334 to ECU 170 of the vehicle by using pilot signal CPLT, in accordance with the duty indicated by a ratio of pulse width Ton to cycle T.

It is noted that the rated current is defined for each charging cable. Depending on the type of the charging cable, the rated current varies, and therefore, the duty of pilot signal CPLT also varies. ECU 170 of the vehicle receives, through the control pilot line, pilot signal CPLT sent from EVSE controller 334 provided at charging cable 300, and detects the duty of received pilot signal CPLT, so that ECU 170 of the vehicle can detect the rated current that can be supplied from power supply 402 through charging cable 300 to the vehicle.

EVSE controller 334 causes relay 332 to be turned on when preparation for charging is completed on the vehicle side.

Figure 6:
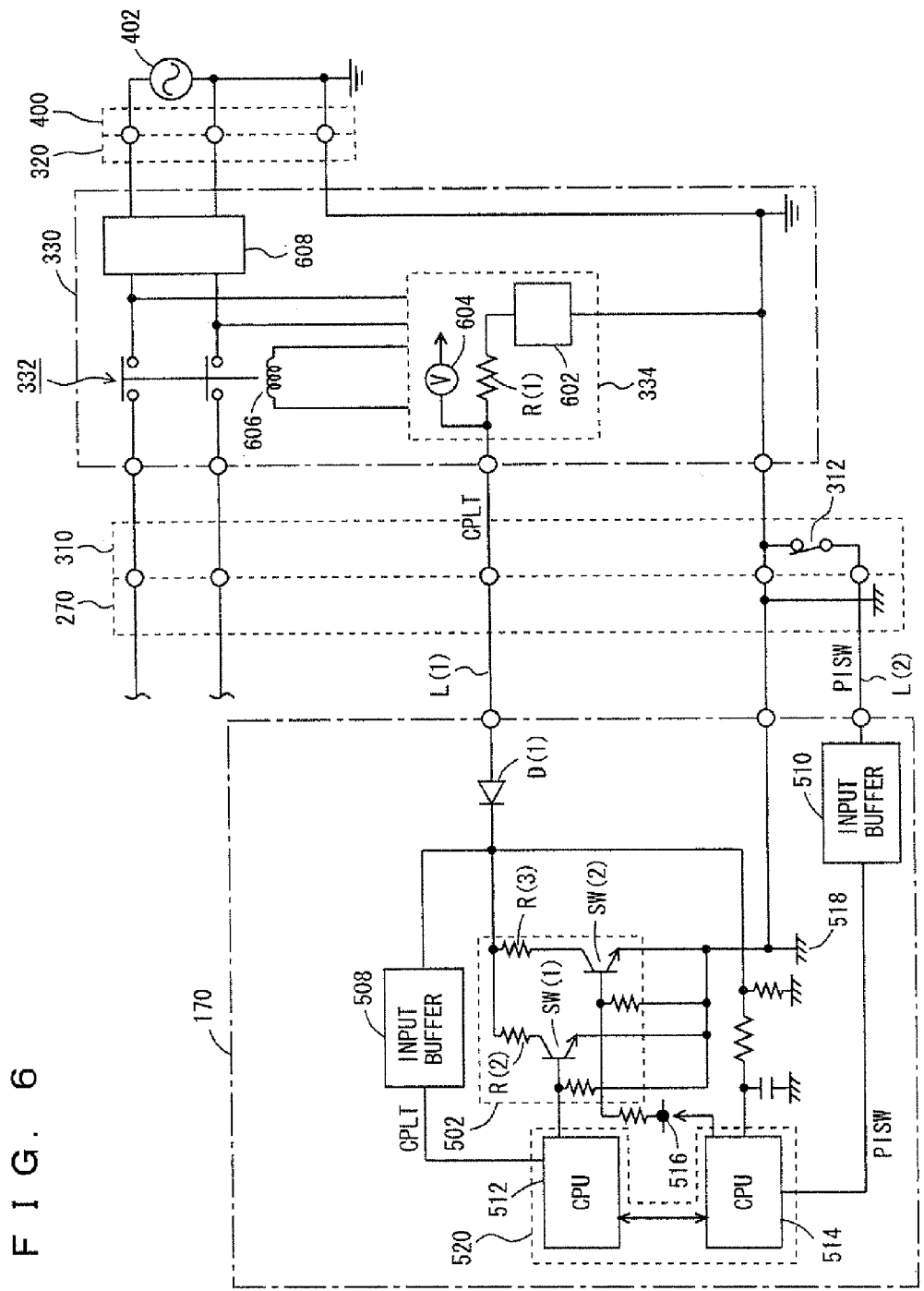
FIG. 6 is a diagram for describing the charging system according to the first embodiment of the present invention.

The portion related to the charging system in the electrical system according to the present embodiment will be further described with reference to FIG. 6.

CCID 330 provided at charging cable 300 includes an electromagnetic coil 606 and a leakage detector 608, in addition to relay 332 and EVSE controller 334. EVSE controller 334 includes an oscillator 602, a resistance element R(1) and a voltage sensor 604.

Oscillator 602 is operated by the electric power supplied from power supply 402. Oscillator 602 outputs a non-oscillating signal when the potential of pilot signal CPLT detected by voltage sensor 604 is around a prescribed initial potential V(1) (for example, 12V), and outputs a signal that oscillates at a prescribed frequency (for example, 1 kHz) and duty cycle, when the potential of pilot signal CPLT is lowered to a prescribed oscillation potential V(2) (for example, 9V) that is lower than V(1).

In addition, EVSE controller 334 supplies a current to electromagnetic coil 606 when the potential of pilot signal CPLT is around a prescribed potential V(3) (for example, 6V). When the current is supplied from EVSE controller 334, electromagnetic coil 606 generates electromagnetic force and relay 332 is turned on. It is noted that the potential of pilot signal CPLT is manipulated by switching a resistance value of resistance circuit 502 of ECU 170 as will be described hereinafter.

Leakage detector 608 is provided at a pair of power lines through which the charging electric power is supplied from power supply 402 to the plug-in hybrid vehicle, and detects the presence or absence of leakage. Specifically, leakage detector 608 detects the equilibrium of the current flowing through the pair of power lines in the opposite direction, and detects the occurrence of leakage when the equilibrium is broken. It is noted that, although not specifically shown, when the leakage is detected by leakage detector 608, to electromagnetic coil 606 is interrupted and relay 332 is turned off.

On the other hand, ECU 170 provided in the plug-in hybrid vehicle includes a resistance circuit 502, input buffers 508, 510, and a CPU (Control Processing Unit) 520. Resistance circuit 502 includes pull-down resistance elements R(2), R(3) and switches SW(1), SW(2). CPU 520 includes a CPU 512 and a CPU 514.

Pull-down resistance element R(2) and switch SW(1) are connected in series between a vehicle earth 518 and a control pilot line L(1) through which pilot signal CPLT is communicated.

Pull-down resistance element R(3) and switch SW(2) are connected in series between vehicle earth 518 and control pilot line L(1), and are connected in parallel to serially-connected pull-down resistance element R(2) and switch SW(1). It is noted that, although an example is shown in FIG. 6 in which switch SW(2) is connected between pull-down resistance element R(3) and vehicle earth 518, switch SW(2) may be connected between control pilot line L(1) and pull-down resistance element R(3). Switch SW(1) is turned on/off in response to a control signal from CPU 512.

When switch SW(1) is turned on, pull-down resistance element R(2) is connected to vehicle earth 518. When switch SW(1) is turned off, pull-down resistance element R(2) is disconnected from vehicle earth 518. It is noted that, in the non-charging state, switch SW(1) is OFF, and pull-down resistance element R(2) and vehicle earth 518 are set to the disconnected state. In other words, when charging cable 300 is connected to the vehicle, switch SW(2) is OFF and pull-down resistance element R(3) is separated from vehicle earth 518.

A power supply 516 whose output power is controlled in response to a control signal from CPU 514 is connected to switch SW(2). When electric power is supplied from power supply 516 to switch SW(2) in response to the control signal from CPU 514, switch SW(2) is turned on and pull-down resistance element R(3) is connected to vehicle earth 518. When the electric power feed from power supply 516 to switch SW(2) is interrupted in response to the control signal from CPU 514, switch SW(2) is turned off and pull-down resistance element R(3) is disconnected from vehicle earth 518. In the non-charging state, switch SW(2) is OFF, and pull-down resistance element R(3) and vehicle earth 518 are set to the disconnected state.

It is noted that switch SW(2) may be configured to be turned on/off in response to the control signal from CPU 512 similarly to switch SW(1). If it is not necessary to distinguish for description between the control signal from CPU 512 and the control signal from CPU 514, the following description will be provided as switches SW(1) and SW(2) being turned on/off in response to the control signal from CPU 520.

Resistance circuit 502 switches the potential of pilot signal CPLT by turning on/off switches SW(1) and SW(2) in response to the control signal from CPU 520.

In other words, when switch SW(1) is turned off and switch SW(2) is turned off in response to the control signal from CPU 520, each of pull-down resistance elements R(2) and R(3) is disconnected from vehicle earth 518 and the potential of pilot signal CPLT is maintained at initial potential V(1). As a result, pilot signal CPLT is maintained in the non-oscillating state.

When switch SW(1) is OFF and switch SW(2) is turned on in response to the control signal from CPU 520, pull-down resistance element R(3) is connected to vehicle earth 518. Therefore, the potential of pilot signal CPLT is lowered to oscillation potential V(2). Furthermore, when switch SW(1) is turned on in response to the control signal from CPU 520, each of pull-down resistance elements R(2) and R(3) is connected to vehicle earth 518. Therefore, the potential of pilot signal CPLT is further lowered to prescribed potential V(3).

Input buffer 508 receives pilot signal CPLT of control pilot line L(1), and outputs received pilot signal CPLT to CPU 512.

Input buffer 510 receives cable connection signal PISW from a signal line L(2) connected to limit switch 312 of connector 310, and outputs received cable connection signal PISW to CPU 514.

It is noted that a predetermined voltage (for example, voltage at the same level as initial potential V(1)) is applied to signal line L(2) from ECU 170, and cable connection signal PISW is set to the HIGH level when connector 310 is not connected to charging inlet 270. When connector 310 is connected to charging inlet 270 and limit switch 312 is turned on, the potential of signal line L(2) is set to the ground level and cable connection signal PISW is set to the LOW level. In other words, the fact that cable connection signal PISW is in the LOW level means the state where charging cable 300 is connected to the vehicle.

CPU 514 determines whether or not connector 310 is connected to charging inlet 270, based on cable connection signal PISW from input buffer 510. Then, CPU 514 outputs the result of the determination to CPU 512.

Figure 7:
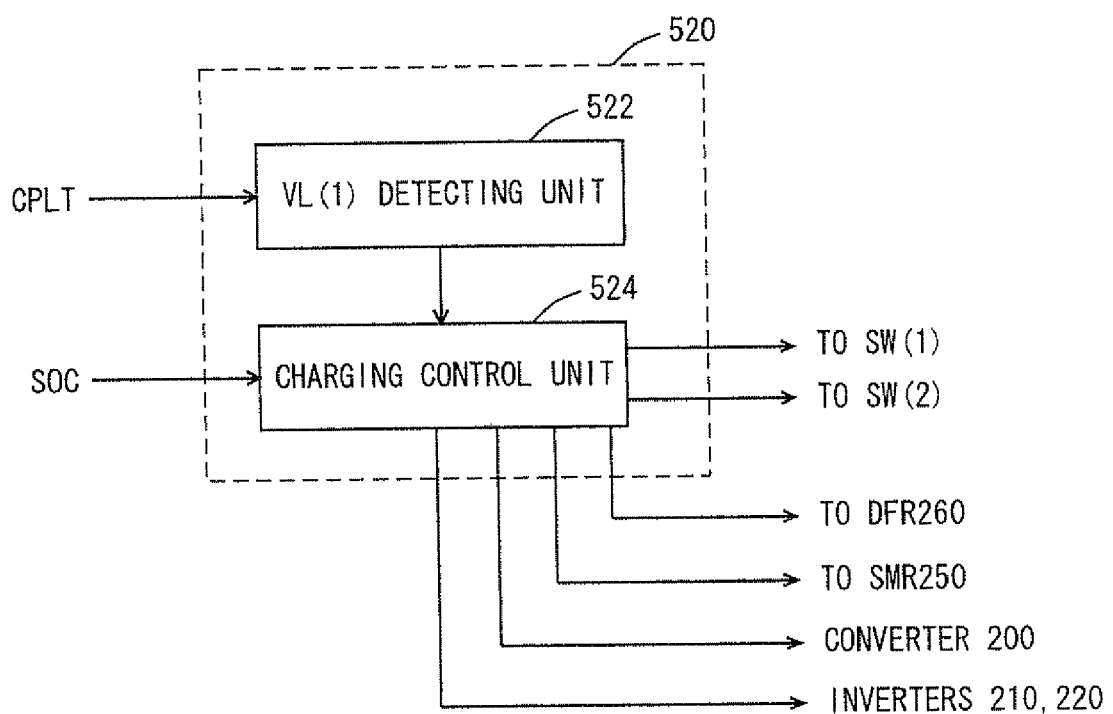
FIG. 7 is a functional block diagram of the charging control apparatus according to the first embodiment of the present invention.

A functional block diagram of the charging control apparatus according to the present embodiment will be described with reference to FIG. 7. As shown in FIG. 7, this charging control apparatus includes a VL(1) detecting unit 522 and a charging control unit 524.

VL(1) detecting unit 522 detects a potential VL(1) of control pilot line L(1) with respect to vehicle earth 518 (voltage between control pilot line L(1) and vehicle earth 518), and outputs a signal indicating the result of the detection to charging control unit 524. The potential of control pilot line L(1) is set to a potential V(0) (for example, 0 volt) when pilot signal CPLT is not input from charging cable 300, and is set to the potential of pilot signal CPLT when pilot signal CPLT is input. It is noted that pilot signal CPLT is not input to control pilot line L(1) in all of the following cases: the case where charging cable 300 is not connected to charging inlet 270; the case where charging cable 300 is not connected to power supply outlet 400 although charging cable 300 is connected to charging inlet 270; and the case of a power failure state where electric power is not supplied to power supply 402 although charging cable 300 is connected to charging inlet 270 and to power supply outlet 400.

Charging control unit 524 controls switches SW(1) and SW(2), DFR 260, SMR 250, converter 200, and inverters 210 and 220, based on the SOC of power storage device 150 and the signal from VL(1) detecting unit 522, and activates the charging system and prepares for charging. In addition, charging control unit 524 controls the charging electric power from charging cable 300.

The control apparatus according to the present embodiment having such functional blocks can be implemented in forms of both hardware and software, the hardware formed mainly of a digital circuit or an analog circuit and the software formed mainly of CPU 520 and memory included in ECU 170, and a program read out from the memory and executed by CPU 520. In general, implementation in the form of hardware is said to be advantageous in operation speed, and implementation in the form of software is said to be advantageous in design change. In the following, implementation of the control apparatus in the form of software will be described. It is noted that a recording medium having such a program recorded therein is also an aspect of the present invention.

Figure 8:
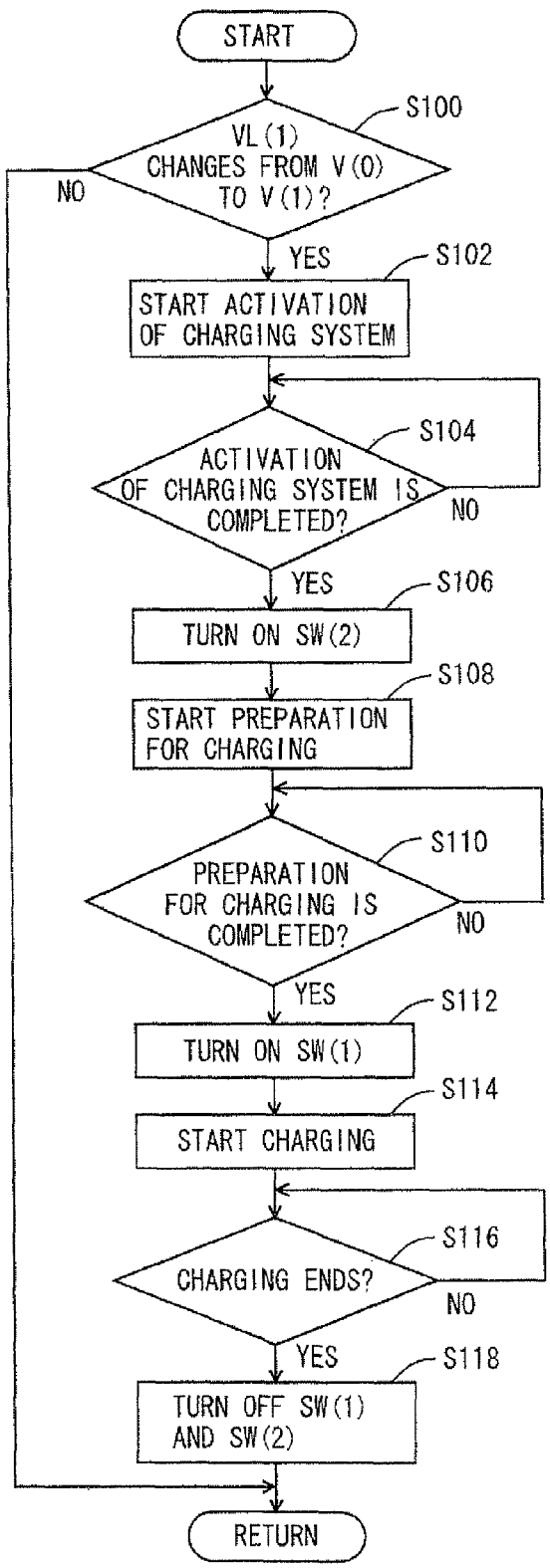
FIG. 8 is a flowchart illustrating a control structure of a CPU that configures the charging control apparatus according to the first embodiment of the present invention.

A control structure of the program executed by CPU 520 serving as the charging control apparatus according to the present embodiment will be described with reference to FIG. 8. It is noted that this program is executed repeatedly in a predetermined cycle time.

In step (that will be abbreviated as "S" hereinafter) 100, CPU 520 determines whether or not potential VL(1) of control pilot line L(1) with respect to vehicle earth 518 has changed from potential V(0) to initial potential V(1). If potential VL(1) of control pilot line L(1) has changed to initial potential V(1) (YES in S100), the process proceeds to S102. If not (NO in S100), this process ends.

In S102, CPU 520 starts activation of the charging system. For example, if CPU 512 performs the process in above S100, CPU 512 sends a command for activating CPU 514 to CPU 514.

In S104, CPU 520 determines whether or not the activation of the charging system has been completed. For example, when CPU 512 receives a response signal to the activation command in above S102 from CPU 514, CPU 520 determines that the activation of the charging system has been completed.

In S106, CPU 520 sends a control signal for turning on switch SW(2) to switch SW(2).

In S108, CPU 520 starts preparation for charging. For example, CPU 520 determines whether or not charging with the power from charging cable 300 is possible, based on the SOC of power storage device 150, the rated current detected from the duty of pilot signal CPLT, and the like, and when determining that charging is possible, CPU 520 causes converter 200 and inverters 210, 220 to wait in an operable state.

In S110, CPU 520 determines whether or not the preparation for charging has been completed. If it is determined that the preparation for charging has been completed (YES in S110), the process proceeds to S112. If not (NO in S110), the process is returned to S110 and waits until the preparation for charging is completed.

In S112, CPU 520 sends a control signal for turning on switch SW(1) to switch SW(1).

In S114, CPU 520 turns on SMR 250 and DFR 260, and starts charging. As a result, AC electric power from power supply 402 is provided to neutral point 112 of first MG 110 and neutral point 122 of second MG 120, and charging of power storage device 150 is controlled.

In S116, CPU 520 determines whether or not charging has ended. For example, when the SOC of power storage device 150 reaches the predetermined value, CPU 520 determines that charging has ended. If it is determined that charging has ended (YES in S116), the process proceeds to S118. If not (NO in S116), the process is returned to S116 and waits until charging ends.

In S118, CPU 520 sends control signals for turning off switches SW(1) and SW(2) to switches SW(1) and SW(2), respectively.

The behavior of pilot signal CPLT controlled by the charging control apparatus according to the present embodiment based on the above structure and flowchart will be described.

[At Start of Charging]

Figure 9:
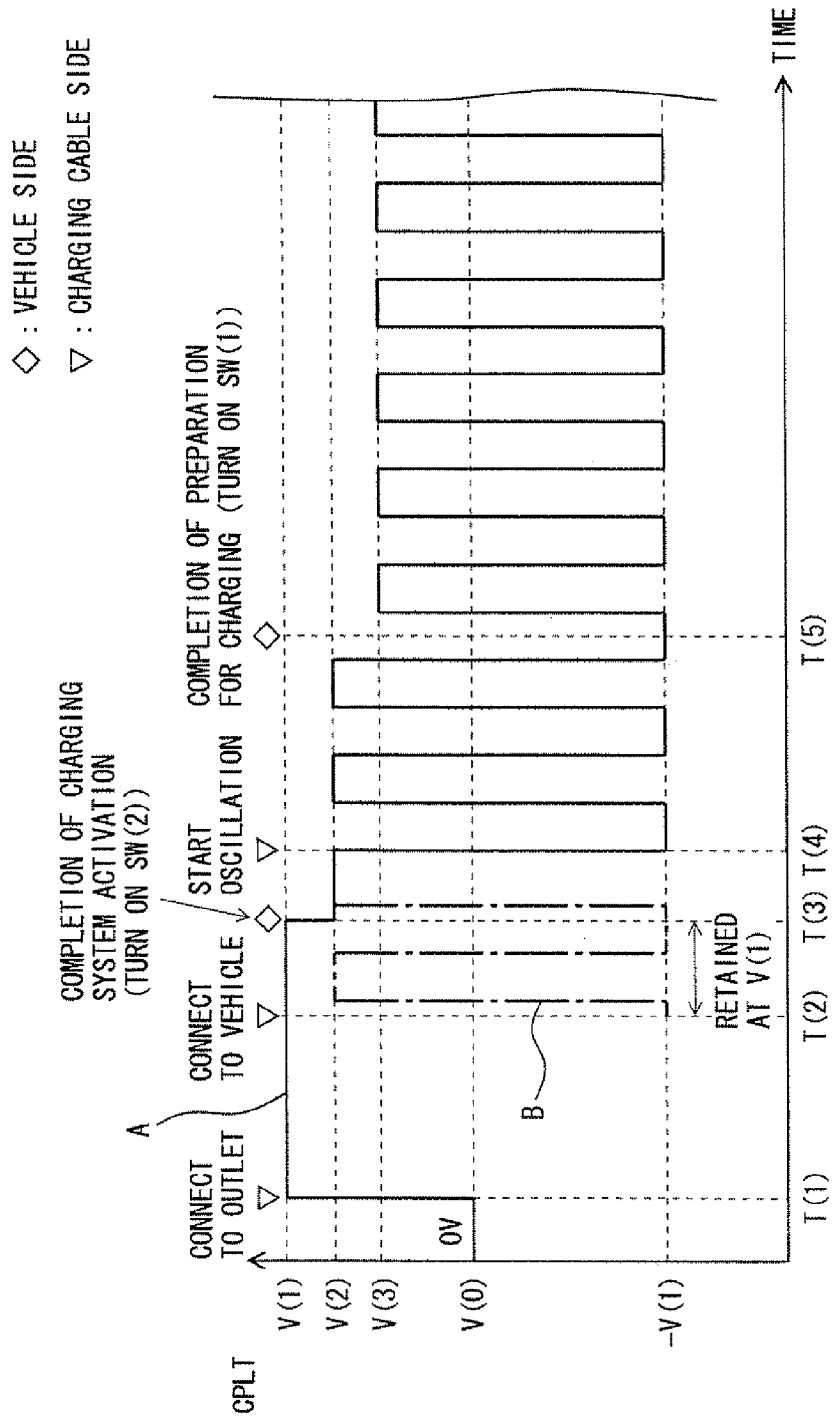
FIG. 9 is a timing chart (No. 1) of a pilot signal CPLT.

At time T(1), when the user connects charging cable 300 to power supply outlet 400, the electric power from power supply 402 is supplied to EVSE controller 334, and the potential of pilot signal CPLT rises from V(0) (0 volt) to initial potential V(1) as shown in FIG. 9.

At time T(2), when the user connects charging cable 300 to charging inlet 270 (that is, the vehicle), pilot signal CPLT is input to control pilot line L(1) on the vehicle side.

Conventionally, switch SW(2) is not provided and pull-down resistance element R(3) is constantly connected to vehicle earth 518. Therefore, at time T(2) when charging cable 300 is connected to charging inlet 270, the potential of pilot signal CPLT is lowered from initial potential V(1) to oscillation potential V(2), and oscillator 602 of charging cable 300 causes pilot signal CPLT to oscillate (see an alternate long and short dashed line B in FIG. 9). For this reason, if an attempt to use pilot signal CPLT as the activation signal for the charging system is made, a complicated F/V (Frequency to Voltage) converter must be used.

Thus, in the present embodiment, switch SW(2) is provided between pull-down resistance element R(3) and vehicle earth 518, and in the non-charging state, switch SW(2) is turned of and pull-down resistance element R(3) is disconnected from vehicle earth 518.

As a result, as shown by a solid line A in FIG. 9, even if charging cable 300 is connected to the vehicle at time T(2), the potential of pilot signal CPLT is retained at initial potential V(1). Therefore, it can be readily determined that potential VL(1) of control pilot line L(1) has changed from V(0) to V(1), without using the complicated F/V converter. When potential VL(1) has changed from V(0) to V(1) (YES in S100), it is determined that connector 310 of charging cable 300 has been connected to charging inlet 270, and the activation of the charging system can start (S102). As a result, even if a circuit for detecting cable connection signal PISW or limit switch 312 within charging cable 300 fails, for example, it can be appropriately determined that charging cable 300 has been connected to the vehicle, based on potential VL(1), and the activation of the charging system can start.

It is noted that, at time T(3), when the activation of the charging system is completed (YES in S104) and switch SW(2) is turned on (S106), the potential of pilot signal CPLT is lowered to oscillation potential V(2). At time T(4), pilot signal CPLT starts to oscillate and the preparation for charging starts (S108). At time T(5), when the preparation for charging is completed (YES in S110) and switch SW(1) is turned on (S112), the potential of pilot signal CPLT is further lowered to potential V(3). As a result, relay 332 in connector 310 within charging cable 300 is turned on, and in addition, SMR 250 and DFR 260 are turned on the vehicle side and charging starts (S114).

[At Completion of Charging]

Figure 10:
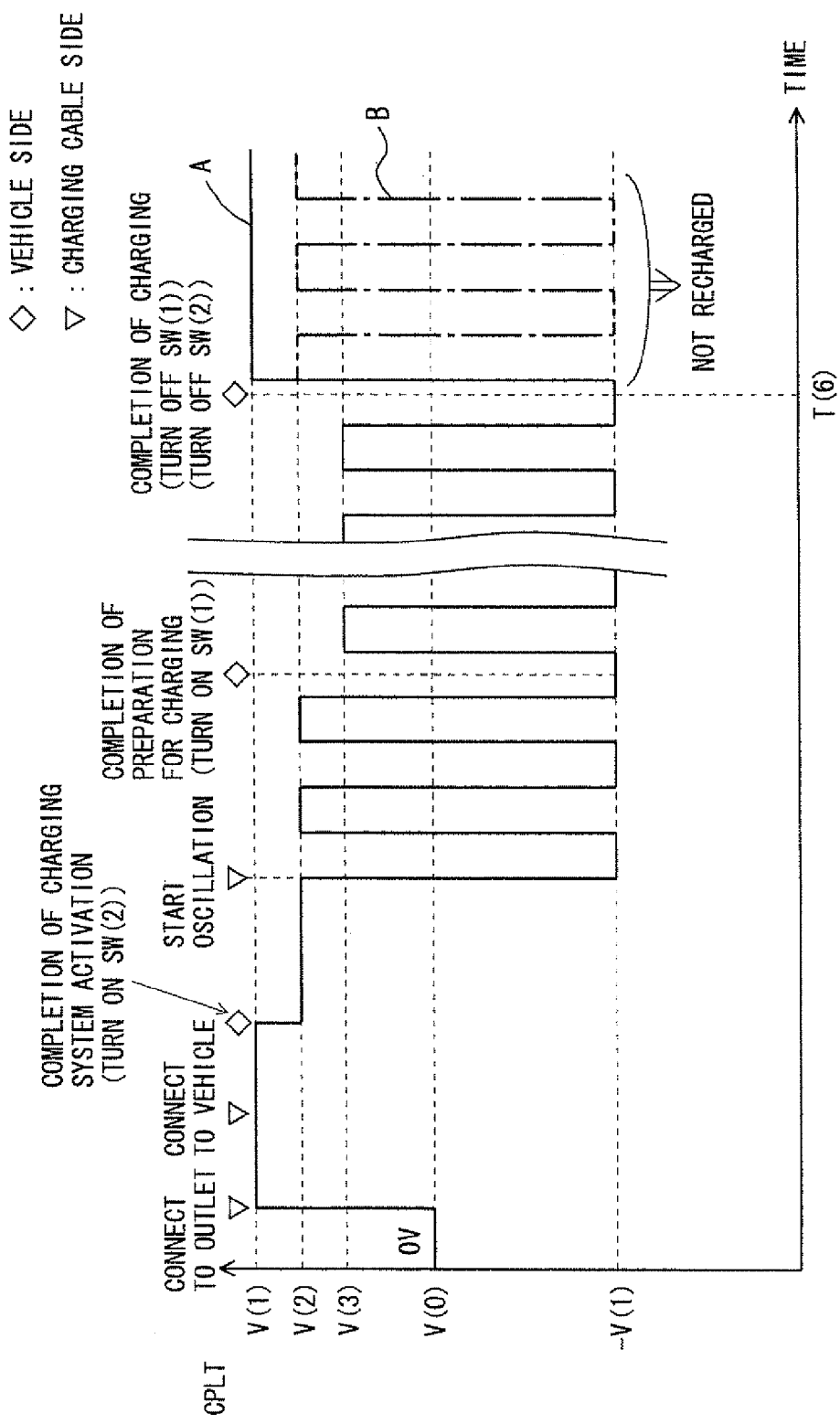
FIG. 10 is a timing chart (No. 2) of pilot signal CPLT.

As shown in FIG. 10, at time T(6), when charging is completed (YES in S116), switch SW(1) and switch SW(2) are turned off (S118).

Conventionally, switch SW(2) is not provided, and even if switch SW(1) is turned off at time T(6) when charging is completed, pull-down resistance element R(3) is constantly connected to vehicle earth 518. Therefore, the potential of pilot signal CPLT only rises from V(3) to oscillation potential V(2), and pilot signal CPLT continues oscillating even after the completion of charging (see an alternate long and short dashed line B in FIG. 10), which is the same as the state when charging cable 300 is connected to the vehicle at the start of charging (see alternate long and short dashed line B in FIG. 9). Therefore, a new process for prohibiting recharge is required.

Thus, in the present embodiment, switch SW(2) is provided between pull-down resistance element R(3) and vehicle earth 518, and at the completion of charging, switches SW(1) and SW(2) are turned off and both of pull-down resistance elements R(2) and R(3) are disconnected from vehicle earth 518. Furthermore, unless potential VL(1) of control pilot line L(1) changes from potential V(0) to initial potential V(1), the activation of the charging system does not start (NO in S100).

As a result, as shown by a solid line A in FIG. 10, potential VL(1) of control pilot line L(1) does not change from potential V(0) to initial potential V(1) at the completion of charging. Therefore, the activation of the charging system does not start (NO in S100) and recharge is not performed. As a result, recharge or over discharge after the completion of charging can be prohibited without requiring the new process for prohibiting recharge.

As described above, according to the charging control apparatus of the present embodiment, the pull-down resistance element for changing the potential of pilot signal CPLT output from the oscillator provided within the charging cable from initial potential V(1) to oscillation potential V(2) is provided on the vehicle side, and the switch is provided between this pull-down resistance element and the vehicle earth. In the non-charging state, the pull-down resistance element is disconnected from the vehicle earth. As a result, even if the charging cable is connected to the vehicle, pilot signal CPLT does not oscillate and the potential of pilot signal CPLT is retained at initial potential V(1). Therefore, it can be readily determined that the potential of the control pilot line has changed to initial potential V(I). Thus, pilot signal CPLT can be readily used as the activation signal for the charging system.

Modification of First Embodiment

Figure 11:
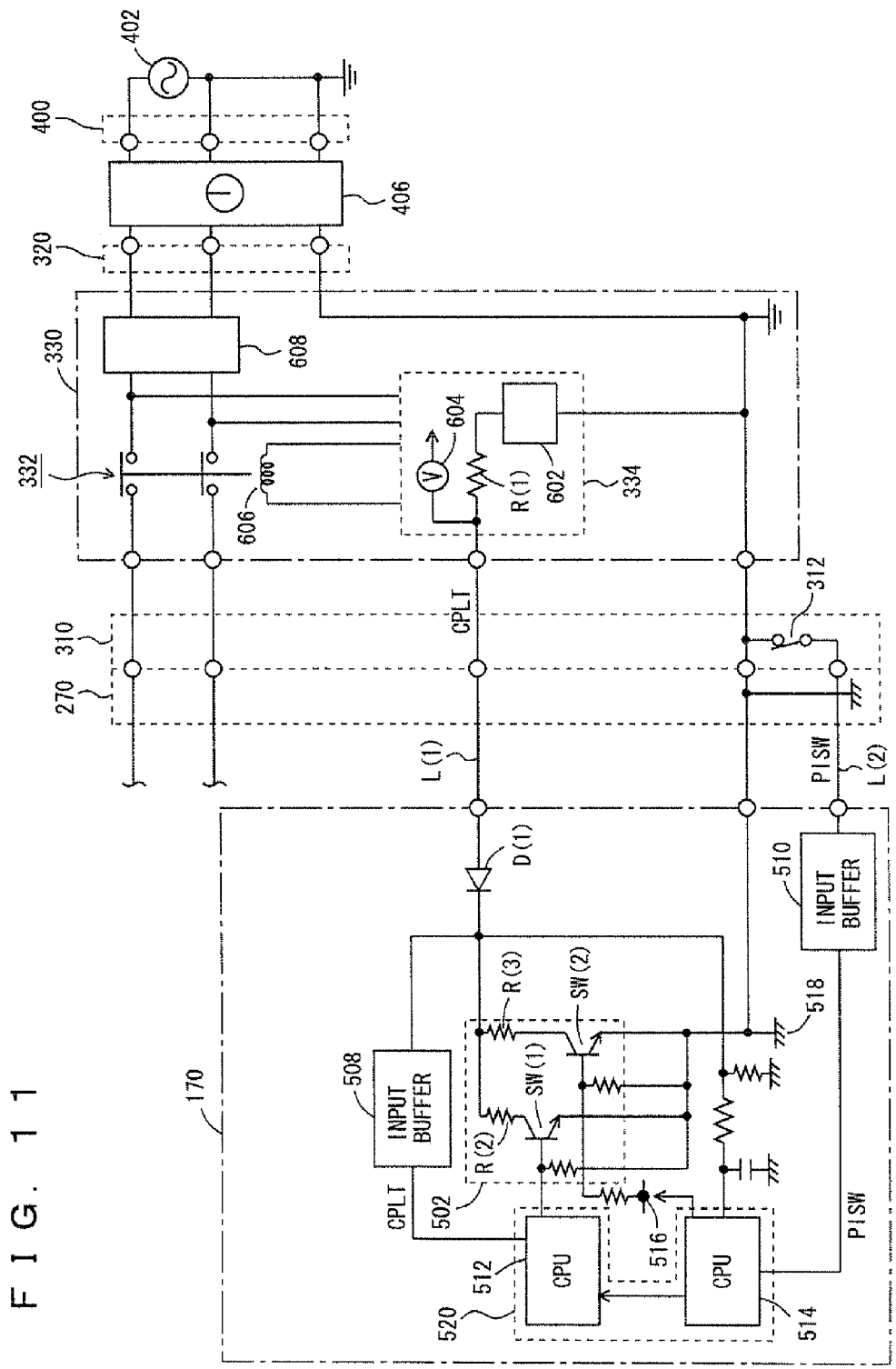
FIG. 11 is a diagram for describing a charging system according to a modification of the first embodiment of the present invention.

In the charging control apparatus according to the above-described first embodiment, a charging timer 406 may be provided between plug 320 and power supply outlet 400 as shown in FIG. 11.

This charging timer 406 is an inexpensive timer that is commercially available typically. Charging timer 406 interrupts the electric power feed from power supply 402 to charging cable 300 until a charging start time preselected by the user comes, and starts the electric power feed from power supply 402 to charging cable 300 when the charging start time comes. It is noted that charging timer 406 may include a function of interrupting the electric power feed from power supply 402 when a charging end time preselected by the user comes.

The behavior of pilot signal CPLT and cable connection signal PISW when such charging timer 406 is used will be described with reference to FIG. 12.

The signal level of cable connection signal PISW changes from the HI level to the LOW level at time T(7) when the user connects charging cable 300 to the vehicle in advance, and remains in the LOW level even when a preselected charging start time T(8) comes. Therefore, cable connection signal PISW cannot be used as the activation signal for the charging system when charging timer 406 is used.

Figure 12:
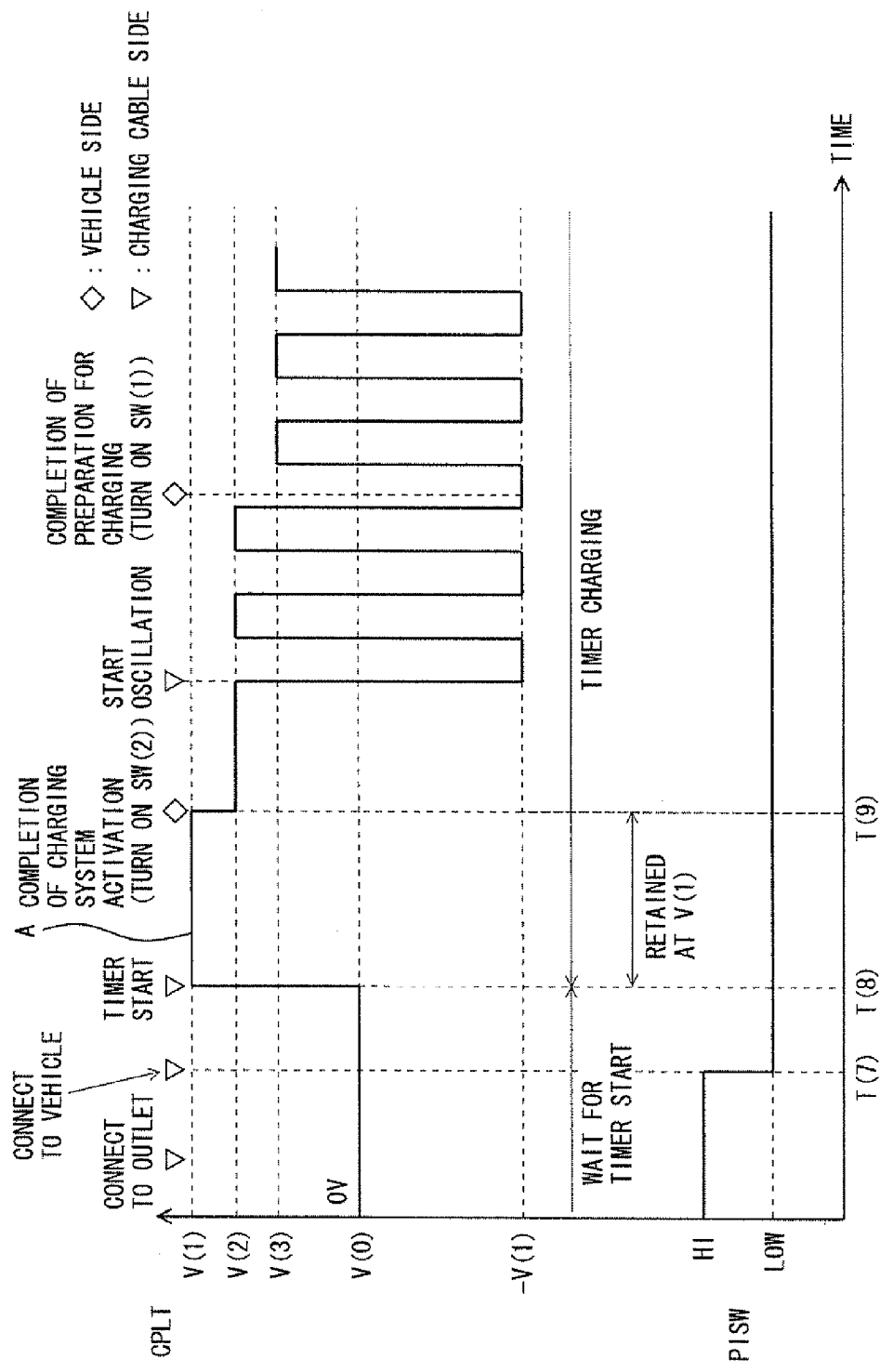
FIG. 12 is a timing chart (No. 1) of pilot signal CPLT and a cable connection signal PISW.

On the other hand, the potential of pilot signal CPLT is maintained at V(0) (0 volt) as shown in FIG. 12 because the electric power from power supply 402 is not supplied to EVSE controller 334 until preselected charging start time T(8) comes. Thereafter, when charging start time T(8) comes, the electric power from power supply 402 is supplied to EVSE controller 334, and the potential of pilot signal CPLT changes from V(0) to initial potential V(1) as shown in FIG. 12. Until time T(9) when switch SW(2) is turned on, the potential of pilot signal CPLT is retained at initial potential V(1) as in the above-described first embodiment. Therefore, it can be readily determined that potential VL(1) has changed from V(0) to V(1). When potential VL(1) has changed from potential V(0) to initial potential V(1) (YES in S100), the activation of the charging system starts (S102).

As described above, simply connecting the commercially available and inexpensive charging timer between plug 320 and power supply outlet 400, without providing the charging timer function on the vehicle side, allows charging at the charging start time (for example, the nighttime when the electric power fee is inexpensive) preselected by the user.

Second Embodiment

A charging control apparatus according to the present embodiment will be described hereinafter. The configuration of the charging control apparatus according to the present embodiment is different from that of the charging control apparatus according to the above-described first embodiment in that CPU 520 further executes a program having a control structure shown in FIG. 14 that will be described hereinafter, in addition to the above program having the control structure shown in FIG. 8. The remaining configuration of the charging control apparatus according to the present embodiment is the same as that of the charging control apparatus according to the above-described first embodiment. Their functions are also the same. Accordingly, detailed description on them will not be repeated here.

FIG. 13 is a table providing the potential of pilot signal CPLT and the level of cable connection signal PISW in the signal state of cable connection signal PISW and the state of charging cable 300. In FIG. 13, the abnormal state refers to the signal state of cable connection signal PISW when limit switch 312 fails or signal line L(2) is broken. The connected state means that charging cable 300 is connected to the vehicle and power supply 402, and the non-connected state means that charging cable 300 is not connected to both the vehicle and power supply 402. In addition, the standby state refers to the state where the electric power from power supply 402 is not supplied to charging cable 300 although charging cable 300 and the vehicle are connected (the state where charging cable 300 is not connected to power supply 402, the state where the charging start time of the charging timer has not come yet although charging cable 300 is connected to power supply 402, the state where the electric power is not supplied to power supply 402 because of a power failure although charging cable 300 is connected to power supply 402, and the like). It is noted that the values of pilot signal CPLT are all normal.

As is clear from FIG. 13, cable connection signal PISW may be set to the HI level in both of the normal state and the abnormal state. It is only when cable connection signal PISW is in the abnormal state (the state where limit switch 312 fails or signal line L(2) is broken) that cable connection signal PISW is set to the HI level although the potential of pilot signal CPLT is at initial potential V(1). Thus, the charging control apparatus according to the present embodiment compares cable connection signal PISW and pilot signal CPLT, and detects an abnormality in cable connection signal PISW (i.e., failure of limit switch 312 or break in signal line L(2)).

Figure 14:
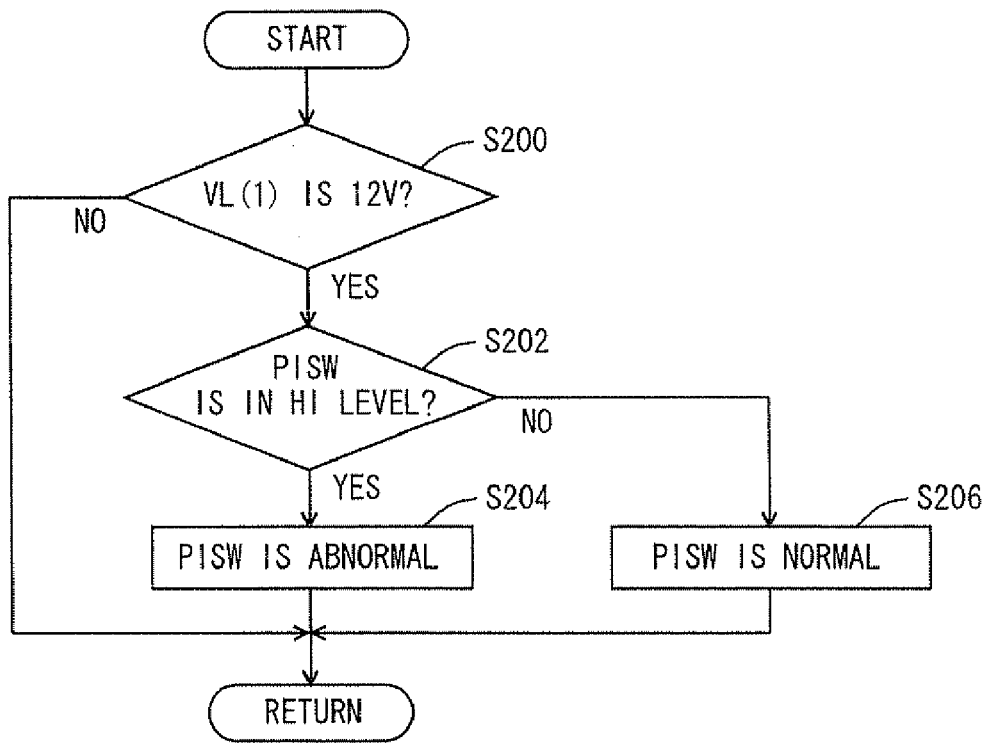
FIG. 14 is a flowchart illustrating a control structure of a CPU that configures a charging control apparatus according to a second embodiment of the present invention.

The control structure of the program executed by CPU 520 that configures the charging control apparatus according to the present embodiment will be described with reference to FIG. 14.

In S200, CPU 520 determines whether or not potential VL(1) of control pilot line L(1) is at initial potential V(1). If potential VL(1) of control pilot line L(1) is at initial potential V(1) (YES in S200), the process proceeds to S202. If not (NO in S200), this process ends.

In S202, CPU 520 determines whether or not cable connection signal PISW is in the HI level. If cable connection signal PISW is in the HI level (YES in S202), the process proceeds to S204. If not (NO in S202), the process proceeds to S206.

In S204, CPU 520 determines that cable connection signal PISW is abnormal and limit switch 312 fails or signal line L(2) is broken. In S206, CPU 520 determines that cable connection signal PISW is normal.

Detection of the abnormality in cable connection signal PISW by the charging control apparatus according to the present embodiment based on the above structure and flow-chart will be described.

Figure 15:
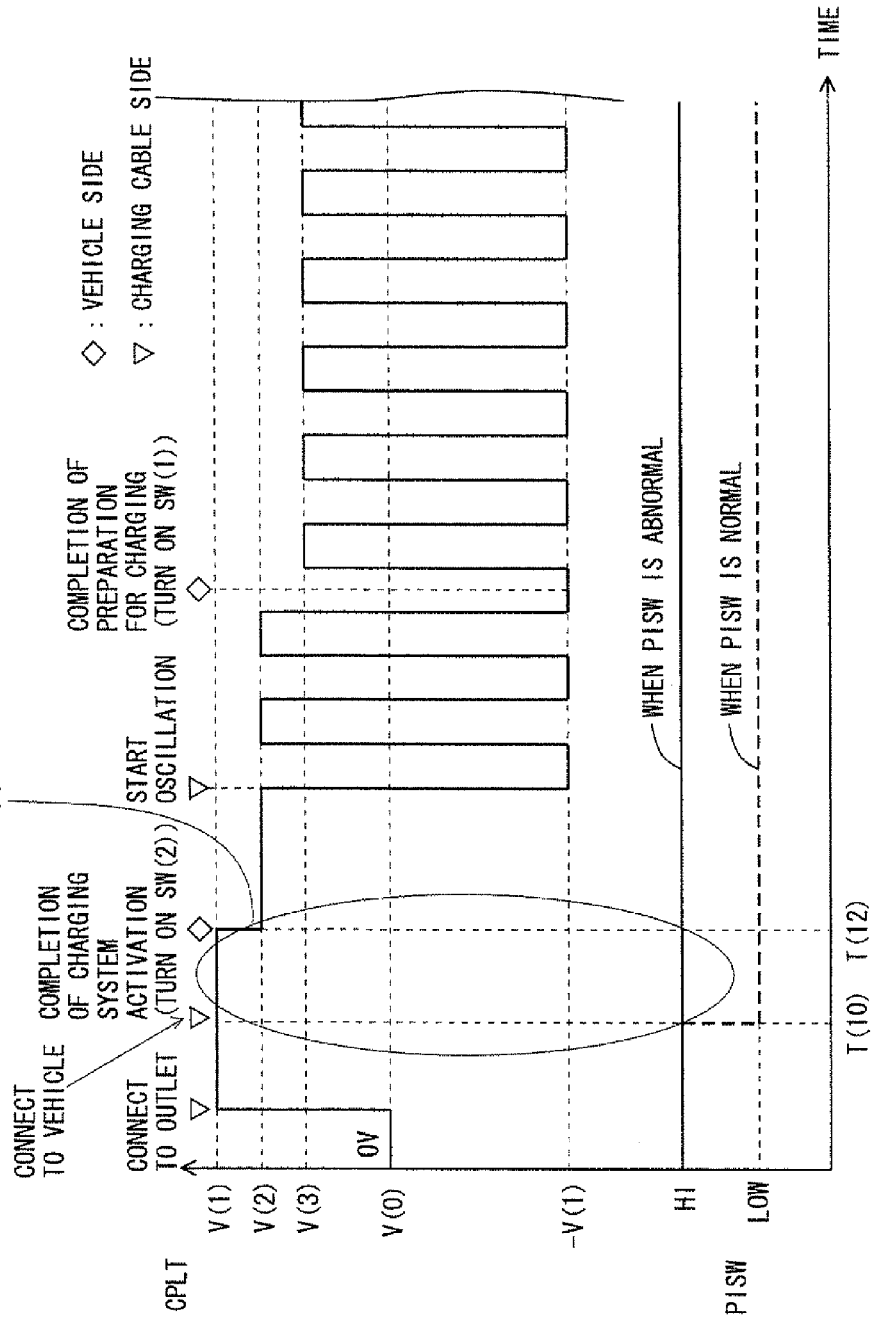
FIG. 15 is a timing chart (No. 2) of pilot signal CPLT and cable connection signal PISW.

As shown in FIG. 15, when cable connection signal PISW is maintained in the HI level although pilot signal CPLT is maintained at V(1) (YES in S200, YES in S202) from time T(10) when charging cable 300 is connected to the vehicle to time T(12) when switch SW(2) is turned on, it is determined that cable connection signal PISW is abnormal and limit switch 312 fails or signal line L(2) is broken (S204).

As described above, according to the charging control apparatus of the present embodiment, the switch is provided between the vehicle earth and the pull-down resistance element for changing the potential of pilot signal CPLT from initial potential V(1) to oscillation potential V(2), and the pull-down resistance element is disconnected from the vehicle earth in the non-charging state. Therefore, it can be readily determined that the potential of the control pilot line is retained at initial potential V(1). When it is detected that cable connection signal PISW remains in the HI level although pilot signal CPLT is retained at initial potential V(1), it can be determined that cable connection signal PISW is abnormal. Therefore, pilot signal CPLT can be readily used for the detection of the abnormality in cable connection signal PISW.

Third Embodiment

A charging control apparatus according to the present embodiment will be described hereinafter. The configuration of charging control apparatus according to the present embodiment is different from that of the charging control apparatus according to the above-described first embodiment in that CPU 520 further executes a program having a control structure shown in FIG. 16 that will be described hereinafter to detect a power failure and recovery from the power failure, in addition to the program having the above control structure shown in FIG. 8. The remaining configuration of the charging control apparatus according to the present embodiment is the same as that of the charging control apparatus according to the above-described first embodiment. Their functions are also the same. Accordingly, detailed description on them will not be repeated here.

Figure 16:
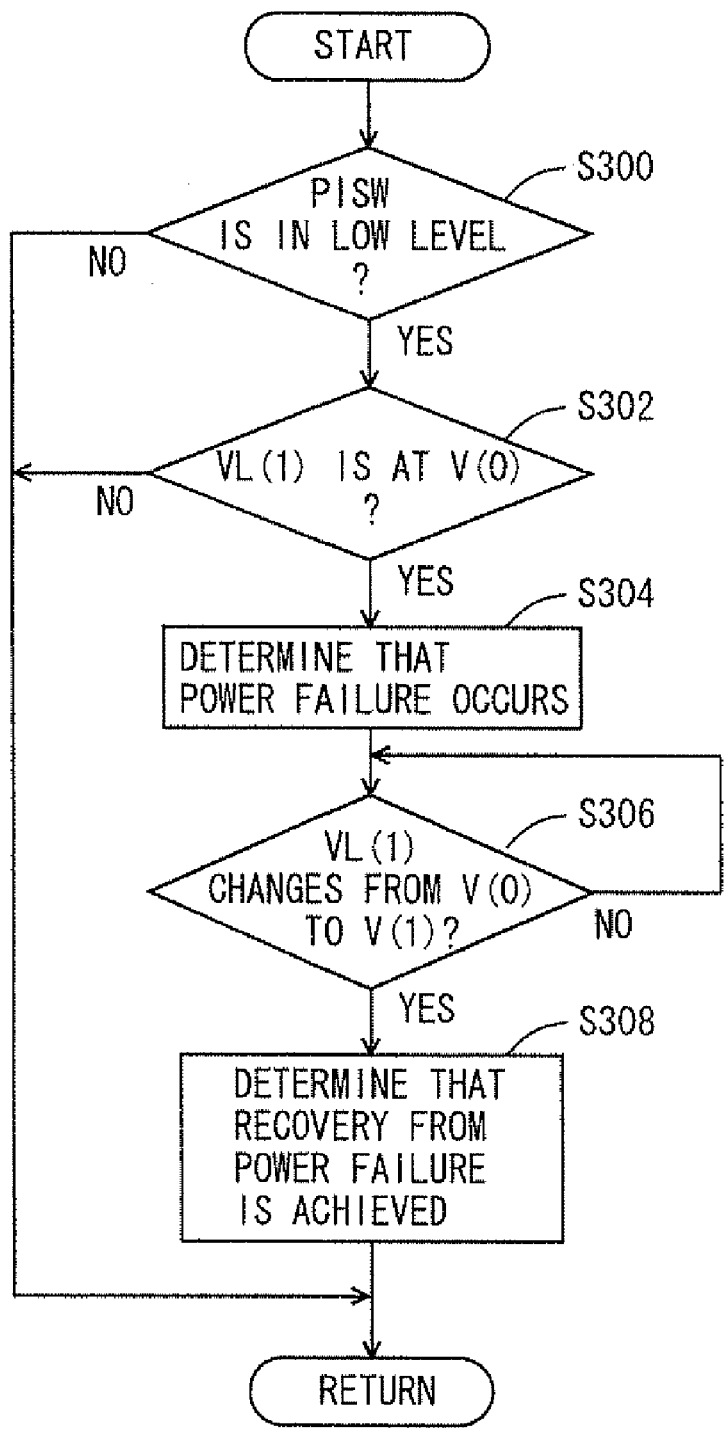
FIG. 16 is a flowchart illustrating a control structure of a CPU that configures a charging control apparatus according to a third embodiment of the present invention.

The control structure of the program executed by CPU 520 that configures the charging control apparatus according to the present embodiment will be described with reference to FIG. 16.

In S300, CPU 520 determines whether or not cable connection signal PISW is in the LOW level. If cable connection signal PISW is in the LOW level (YES in S300), the process proceeds to S302. If not (NO in S300), this process ends.

In S302, CPU 520 determines whether or not potential VL(1) of control pilot line L(1) is at potential V(0). If potential VL(1) of control pilot line L(1) is at V(0) (YES in S302), the process proceeds to S304. If not (NO in S302), this process ends.

In S304, CPU 520 determines that the power failure has occurred. It is noted that the power failure here refers to the state where the electric power feed to power supply 402 is stopped.

In S306, CPU 520 determines whether or not potential VL(1) of control pilot line L(1) has changed from potential V(0) to initial potential V(1). If potential VL(1) of control pilot line L(1) has changed from potential V(0) to initial potential V(1) (YES in S306), the process proceeds to S308. If not (NO in S306), the process is returned to S306 and waits until potential VL(1) of control pilot line L(1) changes from potential V(0) to initial potential V(1).

In S308, CPU 520 determines that recovery from the power failure has been achieved. In other words, CPU 520 determines that the electric power feed to power supply 402 has restarted.

Determination of the power failure and recovery from the power failure by the charging control apparatus according to the present embodiment based on the above structure and flowchart will be described.

As shown in FIG. 17, at time T(13) when charging cable 300 is connected to the vehicle, cable connection signal PISW changes from the HI level to the LOW level. The potential of pilot signal CPLT, however, remains at potential V(0) because of the power failure, until time T(14) when the recovery from the power failure is achieved. Thus, when potential VL(1) of control pilot line L(1) is maintained at potential V(0) although cable connection signal PISW is in the LOW level (YES in S300, YES in S302), it is determined that the power failure has occurred (S304).

When the recovery from the power failure is achieved at subsequent time T(14), the potential of pilot signal CPLT automatically changes from potential V(0) to initial potential V(1) as shown in FIG. 17. When it is detected that potential VL(1) of control pilot line L(1) has changed to initial potential V(1) (YES in S306), it is determined that the recovery from the power failure has been achieved (S308). It is noted that, at the time of the recovery from the power failure as well, the potential of pilot signal CPLT is retained at initial potential V(1) until switch SW(2) is turned on, as in the above-described first embodiment.

As described above, according to the charging control apparatus of the present embodiment, the switch is provided between the vehicle earth and the pull-down resistance element for changing the potential of pilot signal CPLT from initial potential V(1) to oscillation potential V(2), and the pull-down resistance element is disconnected from the vehicle earth in the non-charging state. Therefore, it can be readily determined that the potential of the control pilot line is retained at initial potential V(1). When it is detected that potential VL(1) of control pilot line L(1) has changed from potential V(0) to initial potential V(1) while cable connection signal PISW is in the LOW level, it can be determined that the recovery from the power failure has been achieved. Furthermore, at the time of the recovery from the power failure as well, the activation of the charging system can start in response to the change in potential VL(1) of control pilot line L(1) from potential V(0) to initial potential V(1). Therefore, charging can restart without the need for a troublesome operation such as the user's insertion and removal of charging cable 300 again at the time of the recovery from the power failure, which can enhance the convenience of the user.

It should be understood that the embodiments disclosed herein are illustrative and not limitative in any respect. The scope of the present invention is defined by the terms of the claims, rather than the above description, and is intended to include any modifications within the scope and meaning equivalent to the terms of the claims.

The invention claimed is:

1. A charging control apparatus for a vehicle including a charging system for charging a power storage device with electric power supplied from a power supply external to the vehicle through a charging cable, said vehicle receiving a pilot signal from an oscillator provided in said charging cable when said charging cable connects said power supply and said vehicle, said oscillator causing said pilot signal to oscillate in a pulse width based on magnitude of a rated current that can be supplied to said vehicle, in response to a change in a potential of said pilot signal from an initial potential to an oscillation potential, said charging control apparatus comprising:
  a control pilot line to which said pilot signal is input when said charging cable is connected to said vehicle;
  a resistance element connected between said control pilot line and a vehicle earth, for changing the potential of said pilot signal from said initial potential to said oscillation potential;
  a switching unit connected either between said control pilot line and said resistance element or between said resistance element and said vehicle earth, and switched to any one of a separated state where said resistance element is separated from any one of said control pilot line and said vehicle earth, and a connected state where said resistance element is connected to said control pilot line and said vehicle earth; and
  a control unit for starting activation of said charging system based on a potential of said control pilot line wherein
  said control unit controls said switching unit to said separated state at least upon connecting said charging cable and said vehicle.

2. The charging control apparatus according to claim 1, wherein
  said control unit controls said switching unit to said separated state upon connecting said charging cable and said vehicle, and controls said switching unit to said connected state upon completion of the activation of said charging system.

3. The charging control apparatus according to claim 1, wherein
  said control unit further determines whether or not said charging cable is connected to said vehicle, based on presence or absence of said pilot signal.

4. The charging control apparatus according to claim 1, wherein
  said vehicle receives a connection signal whose output changes in accordance with a state of connection between said charging cable and said vehicle, and
  said control unit further detects an abnormality in said connection signal based on a result of comparison between said connection signal and said pilot signal.

5. The charging control apparatus according to claim 1, wherein
said vehicle receives a connection signal whose output changes in accordance with a state of connection between said charging cable and said vehicle, and
said control unit further detects at least any one of stop of electric power feed to said power supply and restart of electric power feed to said power supply, based on the potential of said control pilot line, when it is deter reined that said charging cable is connected to said vehicle, based on said connection signal.

6. The charging control apparatus according to claim 1, wherein
said pilot signal is input to said control pilot line when a reserved charging time set in a timer for reserving vehicle charging comes, while said charging cable is connected to said vehicle and connected to said power supply with said timer interposed.

* * * * *